July 13, 1943.  C. L. JOHNSON  2,324,303
AIRPLANE ANTI-ICING CONSTRUCTION
Filed Feb. 25, 1941
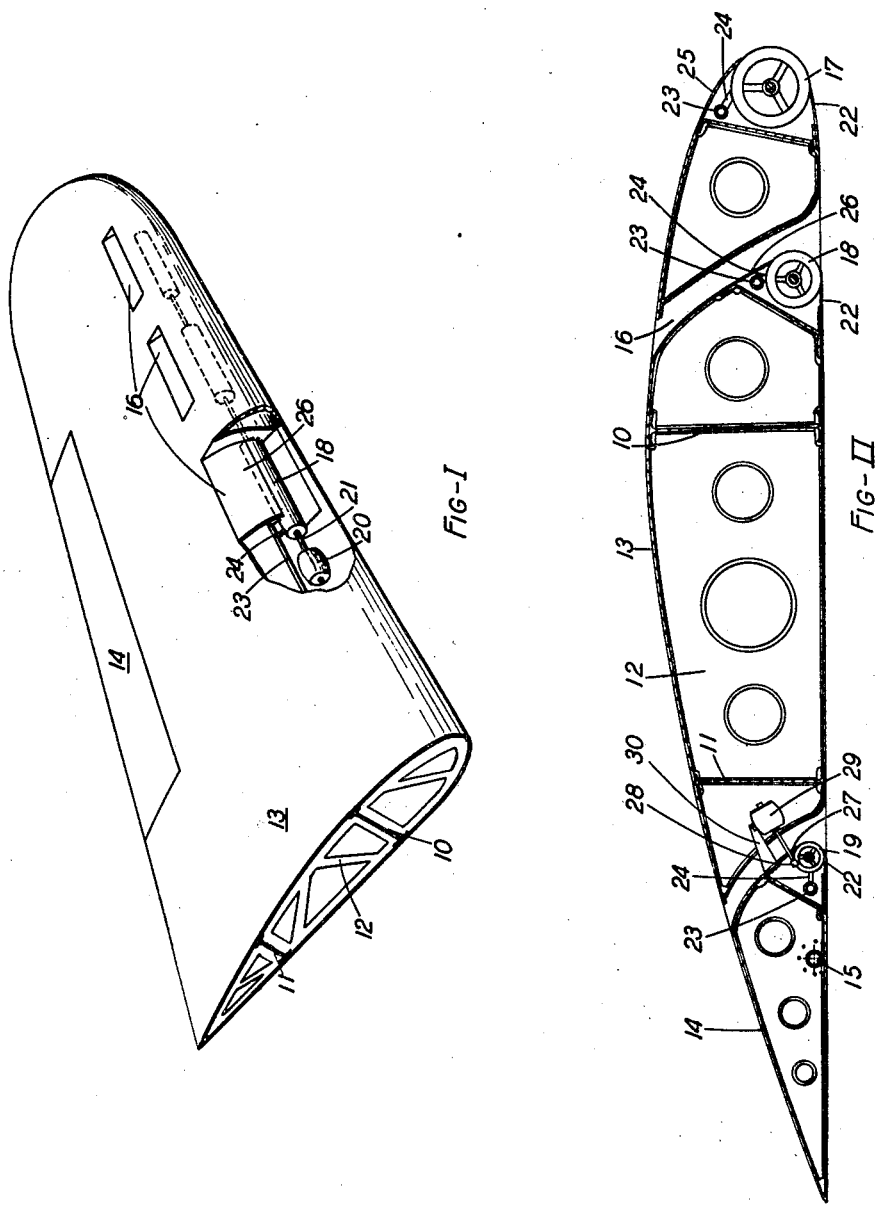
INVENTOR
Clarence L. Johnson Patented July 13, 1943

2,324,303

UNITED STATES PATENT OFFICE 2,324,303

AIRPLANE ANTIICING CONSTRUCTION

Clarence L. Johnson, Encino, Calif., assignor to Lockheed Aircraft Corporation, Burbank, Calif.

Application February 25, 1941, Serial No. 380,520

8 Claims. (Cl. 244—134)

This invention relates to ice removal from airplane surfaces where experience has shown that ice is apt to build up under unfavorable flying conditions.

It has heretofore been proposed to use intermittently inflatable rubber boots on the leading edges of the wings and stabilizers; and to lead heating fluids, such as exhaust gases, through the wing and other surfaces to melt the ice as it forms. Both systems add considerable weight and complexity to the structure, and unfavorably affect other components of the airplane; the rubber boots altering the wing profile to affect the lift thereof, and the exhaust heating systems offering possibilities of trouble with the powerplant or overheating of the exhaust conduits therefor.

It is accordingly an object of this invention to provide an improved and simplified anti-icing arrangement that can be built into the leading edges of the wings, stabilizers, ailerons, wing slots and the like, where ice tends to form under adverse weather conditions.

It is a further object of this invention to provide an improved and simplified anti-icer installation of the class described that will conform to the desired profile of the leading edge of various aerofoils whereby the flying characteristics will not be adversely affected by such installation.

It is also an object of this invention to provide an improved anti-icing arrangement particularly adaptable to movable control surfaces such as ailerons, wherein the operating mechanism for the anti-icing equipment can be arranged to replace part of the static balance ordinarily required thus avoiding the addition of extra weight.

Other and further important objects of this invention will be apparent from the disclosures in the specifications and the accompanying drawing.

This invention in its preferred form is illustrated in the drawing and hereinafter more fully described.

In the drawing:

Figure I is a perspective drawing of an airplane wing panel partly broken away to show the application of my anti-icer to wing tip leading edge slots.

Figure II is a wing section showing the application of anti-icer installations in connection with the leading edge of the wing, the wing slots, and the aileron.

As shown—

A wing panel is somewhat idealistically shown on the drawing as comprising a main beam 10, rear beam 11, ribs 12 and a skin 13, a slotted type aileron 14 being supported from the rear beam 11 and having a pivot point 15. The wing panel, near its tip, is provided with leading edge slots 16.

In general, under icing conditions, ice tends to build up on those portions of the structure that form leading edges influencing a change in direction in the air-flow relative to the wing, which locations are shown in Figure II as equipped with drums 17, 18 and 19 which fair into the normal contour of the wing at these points, with a portion of the drum surface exposed to receive the impact of moisture or snow carried by the air through which the wing is moving.

The drums 17 and 18 may conveniently be driven as shown in connection with the wing slot drums 18 in Figure I wherein a hydraulic or electric motor 20 provides a slow speed drive for a shaft 21 on which the individual drums are mounted. While the direction of rotation is a matter of choice, I prefer to drive the drums in a clockwise direction, in order that a stiff scraping edge 22, preferably of a spring like hardened material, may reject the ice in a downward direction. In case it might be desirable to reject the ice upwardly, a reversal of the direction of rotation would be called for. In order to facilitate removal of the thin sheet of ice formed on the exposed area of the drum, I propose to spray or otherwise apply an anti-icing fluid such as a mixture of glycerine and alcohol, which either acts to lower the freezing point of the moisture gathering on the drum, thus converting the ice to slush, or prevents adhesion of the ice to the drum to facilitate scraping it off. I have shown supply pipes 23 having a series of wicks 24 for applying a thin coat of fluid to the drum, which fluid is further spread out by an overlapping edge 25 of the wing skin 13 in the case of the nose drum 17, which edge also fairs the wing profile into the drum surface. The wing slot is provided with a similar overlapping edge 26 which fairs in with the material defining the slot; and the aileron drum 19 is also faired in by an overlapping edge 27.

The aileron drum 19 may conveniently be driven by gearing 28 from a motor 29 mounted on a bracket 30, which mounting causes the motor to also act as a static balance for the aileron.

In the operation of the anti-icers of this invention, the driving motors and liquid supply will be under the pilot's control by any suitable arrangement permitting him to start and stop the mechanisms as desired. It will be evident that the presence of the anti-icer drums does not affect the wing profile, as would rubber boots, and can be readily incorporated in the rounded leading edges of ailerons, wing slots and wing profiles, at the points where experience has shown that ice tends to initially form. By so controlling the point of initial deposition the building up and spreading out of a heavy coat of ice is effectively prevented. It will be evident that the use of anti-icing fluid will be unnecessary except under conditions of fast freezing and extreme icing proclivities, as under less severe conditions the rotation of the drum may bring the incipient ice to the scraper blade in the form of slush rather than a layer of hard ice.

The rotating drums are preferably operated at a slow speed such as 25 R. P. M. for anti-icing purposes, but could be speeded up to aid in boundary layer control and the rejection of ice by centrifugal force.

In the operation of the device of this invention I have found it desirable to operate the drums in questionable weather and to start the fluid supply when icing conditions are encountered, as the dry drum can control incipient icing until the fluid becomes available. If the dry drum is allowed to gather ice before it is started, it is still possible to break it out of the crust of ice, but there is danger in waiting too long before starting the rotation and liquid supply.

Having thus described my invention and the present preferred embodiments thereof, I desire to emphasize the fact that many modifications may be resorted to in a manner limited only by a just interpretation of the following claims.

I claim:

1. Anti-icing means for the leading edge of aerofoils, including slots therein, comprising a drum having a portion of its periphery exposed as a component of the surface defining said leading edge, means for rotating said drum to continuously expose fresh surfaces thereof to the air flow over said leading edge, a scraper blade forming part of the surface of said leading edge, said blade being arranged to scrape accumulated ice and slush from the surface of said drum, and means adapted to supply anti-icing fluid to the surface of said drum to facilitate the removal of ice therefrom.

2. Anti-icing means for the leading edge of aerofoils, including slots therein, comprising a drum having a portion of its periphery exposed as a component of the surface defining said leading edge, means for rotating said drum to continuously expose fresh surfaces thereof to the air flow over said leading edge, and a scraper blade forming part of the surface of said leading edge, said blade being arranged to scrape accumulated ice and slush from the surface of said drum.

3. Anti-icing means for the leading edge of aerofoils, including slots therein, comprising a drum having a portion of its periphery exposed as a component of the surface defining said leading edge, means for rotating said drum to continuously expose fresh surfaces thereof to the air flow over said leading edge, and means adapted to supply anti-icing fluid to the surface of said drum prior to exposure thereof to facilitate the removal of ice therefrom.

4. Anti-icing mechanism for aerofoils comprising a drum having a portion of its periphery exposed as a component of the aerofoil surface in a region thereof subject to ice formation, means for rotating said drum to expose fresh surfaces thereof to the air flow over the surface of said aerofoil, a scraper blade in contact with said drum and adapted to remove accumulated ice and slush therefrom as the drum is rotated, and means for wetting the surface of said drum with anti-icing fluid to facilitate the removal of ice and slush therefrom by said scraper blade.

5. Anti-icing mechanism for aerofoils comprising a drum having a portion of its periphery exposed as a component of the aerofoil surface in a region thereof subject to ice formation, means for rotating said drum to expose fresh surfaces thereof to the airflow over the surface of said aerofoil, and a scraper blade in contact with said drum and adapted to remove accumulated ice and slush therefrom as the drum is rotated.

6. Anti-icing mechanism for aerofoils comprising a drum having a portion of its periphery exposed as a component of the aerofoil surface in a region thereof subject to ice formation, means for rotating said drum to expose fresh surfaces thereof to the air flow over the surface of said aerofoil and means for wetting said drum with anti-icing fluid to reduce the adhesion of ice deposited on said drum.

7. In combination with an aileron of the slotted type, a drum having a portion of its periphery exposed as a component of the leading edge of the aileron, means adapted to remove ice from the exposed surface of said drum, a motor for rotating said drum, a mounting bracket for said motor adapted to support the same as a static balance for said aileron, and drive means connecting said motor to said drum for driving the same.

8. In combination with an aileron of the slotted type, a drum having a portion of its periphery exposed as a component of the leading edge of the aileron, means adapted to remove ice from the exposed surface of said drum including means for supplying a fluid to the surface of said drum, a motor for rotating said drum, a mounting bracket for said motor adapted to support the same as a static balance for said aileron, and drive means connecting said motor to said drum for driving the same.

CLARENCE L. JOHNSON.